United States Patent Office 3,171,780
Patented Mar. 2, 196

3,171,780
COPPER AND ZINC ALKYL TRITHIOCAR-
BONATES AND MERCAPTIDES AS BIRD
REPELLENTS
Tyson H. Mallen, Bartlesville, Okla., assignor to Phillips
Petroleum Company, a corporation of Delaware
No Drawing. Filed June 7, 1960, Ser. No. 34,372
24 Claims. (Cl. 167—46)

This invention relates to a method of repelling birds. In one of its aspects, the invention relates to a method for rendering a locus repellent to birds. In another of its aspects, the invention relates to a method for rendering a surface repellent to birds. In still another of its aspects, the invention relates to a method for treating seeds, grain, and the like so as to render the same repellent to birds that normally feed thereon. A further aspect of the invention relates to a method for treating buildings to render the same repellent to birds.

A number of repellents for certain pests, such as insects and rodents have been developed and are known in the art. However, very little success has been attained in the search for a material which is repellent to birds. It is very desirable to be able to repel birds from certain areas and surfaces. For instance, the loss of grain at the present time to feeding birds represents a large financial loss to the farmers of this country each year. Also, as is well known, many birds through their roosting habits foul buildings, sidewalks and the like.

It is an object of this invention to provide new bird repellent compositions. It is a further object of this invention to provide a method for repelling birds. Still another object is to provide a method for rendering surfaces repellent to birds.

Other aspect, objects, and the several advantages of the invention are apparent from a study of the disclosure and the appended claims.

According to the present invention, it has been discovered that birds can be repelled from surfaces frequented by them by applying to said surfaces an amount of at least one compound selected from the groups consisting of

wherein R is an alkyl group having from 1 to 20 carbon atoms, M is a metal ion selected from the group consisting of cuprous and zinc, and $n$ is the valence of the metal ion;

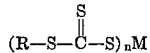

wherein R is an alkyl group containing from 1 to 20 carbon atoms, M is a metal ion selected from the group consisting of cupric and zinc, and $n$ is the valence of the metal ion;

Cupric trithiocarbonate;
Zinc trithiocarbonate;
Cuprous alkyl sulfonium cyanide;
Zinc alkyl sulfonium cyanide;
Cuprous alkyl sulfonium chloride;
Zinc alkyl sulfonium chloride;
2,5-dithiahexane-cuprous cyanide adduct;
2,5-dithiahexane-zinc cyanide adduct;
2,5-dithiahexane-cuprous chloride adduct; and
2,5-dithiahexane-zinc chloride adduct.

The alkyl group of the sulfonium compounds conta from 1 to 20 carbon atoms.

Specific examples of compounds falling within the sc of the above are:

Cuprous methyl mercaptide
Cuprous n-octyl mercaptide
Cuprous tert-butyl mercaptide
Cuprous tert-octyl mercaptide
Cuprous tert-dodecyl mercaptide
Zinc methyl mercaptide
Zinc n-octyl mercaptide
Zinc tert-butyl mercaptide
Zinc tert-octyl mercaptide
Zinc tert-dodecyl mercaptide
Cupric methyl trithiocarbonate
Cupric tert-butyl trithiocarbonate
Cupric tert-dodecyl trithiocarbonate
Zinc trithiocarbonate
Zinc methyl trithiocarbonate
Zinc tert-butyl trithiocarbonate
Zinc tert-dodecyl trithiocarbonate
Cuprous n-butyl sulfonium cyanide
Zinc n-butyl sulfonium cyanide
Cuprous tert-butyl sulfonium chloride
Zinc tert-butyl sulfonium chloride
2,5-dithiahexane-cuprous cyanide adduct
2,5-dithiahexane-zinc cyanide adduct
2,5-dithiahexane-cuprous chloride adduct
2,5-dithiahexane-zinc chloride adduct and the like.

The bird repellents of this invention can be applied their intended purpose as the pure compound, or in co bination with a carrier or inert materials such as soluti or emulsions. Solvents or carriers can be used which substantially inert with respect to the active bird rep lent. Examples of carrier materials which can be e ployed are Acetone
Deodorized kerosene
Naphthas
Isoparaffinic hydrocarbon fractions boiling in the proximate range of 260–800° F. (Soltrol)

and the like. If desired, the bird repellents of this vention can be applied as aqueous emulsions, in wh case, a suitable emulsifying or wetting agent is employ The repellent materials can also be applied as dusts, us such solid carriers as kieselguhr and the like. In ad tion, the materials for repelling birds can be applied surfaces from which it is desired to repel these anim in conjunction with an adhesive.

The bird repellents of this invention can be applied the above-described form by spraying, brushing, dusti etc. The preferred method of application is by sprayi a liquid composition on the surface to be treated. Wh applying the repellents of this invention in a solvent carrier, the liquid compositions will normally cont: from 0.1 to 10 weight percent of one of the above-scribed compounds, although concentrations above a below this range can be used. When these materials applied in the form of dusts, the concentration of acti ingredient is preferably within the range between 1 a 20 weight percent, although concentrations above a below this range are applicable.

The bird repellents of this invention are applied to s faces in a manner so as to deposit an amount within t ge between 1 and 10 grams of the active repellent ma-
al per each 100 square feet of surface from which the
ls are to be repelled. Larger or smaller amounts can
applied, if desired, although larger amounts are gen-
ly uneconomical.
When the bird repellents of this invention are applied
eed, grain, or the like, application is normally made
s to deposit between 0.05 and 12 weight percent, based
the feed, of the active repellent although amounts
ve and below this range can be used. A more pre-
ed range is from 0.1 to 2 weight percent. Examples
rain and feed which are normally consumed by birds
which can be treated according to this invention are Rice
   Wheat
   Barley
   Sorghum grain
   Fruit plant seeds of flowers, vegetables, and the like. In
tion, these bird repellents can be applied to window
es, roofs, beams, and the like.

EXAMPLE I epresentative compounds of the types falling within
scope of the invention were tested by comparing these
pounds with materials known to have excellent re-
ency for birds. For these tests, two 50 gram samples
ilo were treated with the test compound and with the
parative compound, respectively, and were placed
 cage with the test bird. For each test compound a
rol test was also run in which an untreated sample
rain was placed in the bird cage. Solid materials
 applied to the grain with the aid of an adhesive Dow
 512–R. At the end of 96 hours, the samples of
n were weighed to determine the weight of grain the
 had taken. The test data are shown in Table I.
 all tests, the comparative compounds were used at a
ercent concentration, while the test compounds were
d at 10, 4, 2, and 1 percent concentrations. In nearly
tests, the test compounds had as good or better re-
ency than the prior art compounds known to have
llent repellency. This was true even in most instances
hich low concentration of the test compounds were
.

Table I

TEST COMPOUND: CUPROUS METHYL MERCAPTIDE

| Test Compound Percent | Test Compound Grams Taken | Comparative Compound | Percent | Grams Taken | Bird |
|---|---|---|---|---|---|
| 10 | 0 | None | | 48 | Pigeon. |
| 10 | 0 | Spergon | 10 | 0 | Do. |
| 10 | 0 | ___do___ | 10 | 0 | Do. |
| 10 | 7 | Anthraquinone | 10 | 0 | Do. |
| 10 | 0 | Quinizarine | 10 | 0 | Do. |
| 10 | 0 | Arasan 50 | 10 | 2 | Blackbird. |
| 10 | 0 | Arasan 75 | 10 | 0 | Pigeon. |
| 4 | 14 | Anthraquinone | 10 | 1 | Do. |
| 4 | 0 | Arasan 50 | 10 | 0 | Do. |
| 2 | 0 | Anthraquinone | 10 | 0 | Do. |
| 2 | 15 | Arasan 50 | 10 | 1 | Do. |
| 1 | 11 | Anthraquinone | 10 | 11 | Do. |
| 1 | 9 | Arasan 50 | 10 | 0 | Do. |

TEST COMPOUND: CUPROUS TERT-BUTYL MERCAPTIDE

| Percent | Grams Taken | Comparative Compound | Percent | Grams Taken | Bird |
|---|---|---|---|---|---|
| 10 | 0 | None | | 25 | Pigeon. |
| 10 | 0 | Spergon | 10 | 7 | Do. |
| 10 | 1 | Anthraquinone | 10 | 0 | Do. |
| 10 | 0 | Quinizarine | 10 | 0 | Dove. |
| 10 | 1 | Arasan 50 | 10 | 0 | Blackbird. |
| 10 | 10 | Arasan 75 | 10 | 0 | Do. |
| 4 | 0 | Anthraquinone | 10 | 0 | Pigeon. |
| 4 | 0 | Arasan 50 | 10 | 0 | Do. |
| 2 | 14 | Anthraquinone | 10 | 3 | Do. |
| 2 | 22 | Arasan 50 | 10 | 0 | Do. |
| 1 | 0 | Anthraquinone | 10 | 0 | Do. |
| 1 | 0 | Arasan 50 | 10 | 0 | Do. |

Table I—Continued

TEST COMPOUND: CUPROUS TERT-OCTYL MERCAPTIDE

| Run No. | Test Compound Percent | Test Compound Grams Taken | Comparative Compound | Percent | Grams Taken | Bird |
|---|---|---|---|---|---|---|
| 126 | 10 | 0 | None | | 50 | Pigeon. |
| 127 | 10 | 0 | Spergon | 10 | 0 | Do. |
| 128 | 10 | 0 | Anthraquinone | 10 | 0 | Do. |
| 129 | 10 | 1 | Quinizarine | 10 | 0 | Do. |
| 130 | 10 | 1 | Arasan 50 | 10 | 0 | Dove. |
| 131 | 10 | 0 | Arasan 75 | 10 | 0 | Pigeon. |
| 132 | 4 | 0 | Anthraquinone | 10 | 9 | Do. |
| 133 | 4 | 2 | Arasan 50 | 10 | 3 | Do. |
| 134 | 2 | 0 | Anthraquinone | 10 | 0 | Do. |
| 135 | 2 | 0 | Arasan 50 | 10 | 0 | Do. |
| 136 | 1 | 6 | Anthraquinone | 10 | 17 | Do. |
| 137 | 1 | 0 | Arasan 50 | 10 | 0 | Do. |

TEST COMPOUND: CUPROUS TERT-DODECYL MERCAPTIDE

| Run No. | Percent | Grams Taken | Comparative Compound | Percent | Grams Taken | Bird |
|---|---|---|---|---|---|---|
| 139 | 10 | 0 | None | 10 | 29 | Dove. |
| 140 | 10 | 0 | Spergon | 10 | 0 | Blackbird. |
| 141 | 10 | 1 | ___do___ | 10 | 1 | Do. |
| 142 | 10 | 0 | Anthraquinone | 10 | 1 | Dove. |
| 143 | 10 | 0 | Quinizarine | 10 | 0 | Do. |
| 144 | 10 | 0 | Arasan 50 | 10 | 0 | Do. |
| 145 | 10 | 0 | ___do___ | 10 | 2 | Do. |

TEST COMPOUND: CUPRIC METHYL TRITHIOCARBONATE

| Run No. | Percent | Grams Taken | Comparative Compound | Percent | Grams Taken | Bird |
|---|---|---|---|---|---|---|
| 146 | 10 | 0 | None | 10 | 36 | Pigeon. |
| 147 | 10 | 0 | Spergon | 10 | 0 | Do. |
| 148 | 10 | 1 | Anthraquinone | 10 | 1 | Blackbird. |
| 149 | 10 | 0 | Quinizarine | 10 | 0 | Dove. |
| 150 | 10 | 0 | Arasan 50 | 10 | 0 | Do. |
| 151 | 10 | 0 | Arasan 75 | 10 | 0 | Blackbird. |
| 152 | 4 | 0 | Anthraquinone | 10 | 0 | Pigeon. |
| 153 | 4 | 0 | Arasan 50 | 10 | 0 | Do. |
| 154 | 2 | 0.5 | Anthraquinone | 10 | 0.5 | Do. |
| 155 | 2 | 1 | Arasan 50 | 10 | 0 | Do. |
| 156 | 1 | 0 | Anthraquinone | 10 | 0 | Do. |
| 157 | 1 | 0 | Arasan 50 | 10 | 0 | Do. |

TEST COMPOUND: ZINC TRITHIOCARBONATE

| Run No. | Percent | Grams Taken | Comparative Compound | Percent | Grams Taken | Bird |
|---|---|---|---|---|---|---|
| 158 | 10 | 0 | None | 10 | 50 | Pigeon. |
| 159 | 10 | 0 | Anthraquinone | 2.5 | 2 | Do. |
| 160 | 10 | 1 | Quinizarine | 10 | 0 | Do. |
| 161 | 10 | 0 | ___do___ | 10 | 0 | Do. |
| 162 | 10 | 1 | Arasan 50 | 10 | 1 | Do. |
| 163 | 10 | 0 | Arasan 75 | 10 | 0 | Do. |
| 164 | 4 | 0 | Anthraquinone | 10 | 1 | Do. |
| 165 | 4 | 0 | Arasan 50 | 10 | 0 | Do. |
| 166 | 2 | 0 | Anthraquinone | 10 | 0 | Do. |
| 167 | 2 | 0 | Arasan 50 | 10 | 0 | Do. |
| 168 | 1 | 0 | Anthraquinone | 10 | 0 | Do. |
| 169 | 1 | 0 | Arasan 50 | 10 | 0 | Do. |

TEST COMPOUND: ZINC TERT-BUTYL TRITHIOCARBONATE

| Run No. | Percent | Grams Taken | Comparative Compound | Percent | Grams Taken | Bird |
|---|---|---|---|---|---|---|
| 170 | 10 | 0 | None | 10 | 50 | Pigeon. |
| 171 | 10 | 0 | Spergon | 10 | 0 | Do. |
| 172 | 10 | 1 | ___do___ | 10 | 0 | Blackbird. |
| 173 | 10 | 0 | Anthraquinone | 10 | 0 | Pigeon. |
| 174 | 10 | 0 | Arasan 50 | 10 | 0 | Blackbird. |
| 175 | 10 | 1 | ___do___ | 10 | 0 | Pigeon. |
| 176 | 10 | 0 | Arasan 75 | 10 | 0 | Do. |
| 177 | 4 | 1 | Anthraquinone | 10 | 1 | Do. |
| 178 | 4 | 0 | Arasan 50 | 10 | 0 | Do. |
| 179 | 2 | 50 | Anthraquinone | 10 | 5 | Do. |
| 180 | 2 | 0 | Arasan 50 | 10 | 0 | Do. |
| 181 | 2 | 0 | ___do___ | 10 | 0 | Do. |
| 182 | 1 | 50 | Anthraquinone | 10 | 0 | Do. |
| 183 | 1 | 1 | Arasan 50 | 10 | 1 | Do. |
| 184 | 1 | 47 | ___do___ | 10 | 0 | Do. |

TEST COMPOUND: ZINC TERT-DODECYL TRITHIOCARBONATE

| Run No. | Percent | Grams Taken | Comparative Compound | Percent | Grams Taken | Bird |
|---|---|---|---|---|---|---|
| 185 | 10 | 0 | None | 10 | 38 | Blackbird. |
| 186 | 10 | 2 | Spergon | 10 | 0 | Pigeon. |
| 187 | 10 | 0 | Anthraquinone | 10 | 2 | Do. |
| 188 | 10 | 0 | Quinizarine | 10 | 0 | Dove. |
| 189 | 10 | 0 | Arasan 50 | 10 | 0 | Do. |
| 190 | 10 | 0 | ___do___ | 10 | 0 | Do. |
| 191 | 10 | 0 | Arasan 75 | 10 | 0 | Pigeon. |
| 192 | 4 | 1 | Anthraquinone | 10 | 0 | Do. |
| 193 | 4 | 0 | Arasan 50 | 10 | 0 | Do. |
| 194 | 2 | 1 | Anthraquinone | 10 | 0 | Do. |
| 195 | 2 | 3 | Arasan 50 | 10 | 2 | Do. |
| 196 | 1 | 50 | ___do___ | 10 | 4 | Do. |

Table I—Continued

TEST COMPOUND: CUPROUS N-BUTYL SULFONIUM CYANIDE

| Run No. | Test Compound Percent | Test Compound Grams Taken | Comparative Compound | Percent | Grams Taken | Bird |
|---|---|---|---|---|---|---|
| 197 | 1 | 0 | None | 10 | 12 | Dove. |
| 198 | 1 | 2 | Spergon | 10 | 0 | Pigeon. |
| 199 | 1 | 3 | Anthraquinone | 10 | 0 | Do. |
| 200 | 1 | 0 | Arasan 50 | 10 | 0 | Dove. |
| 201 | 1 | 15 | Arasan 75 | 10 | 0 | Pigeon. |
| 202 | 1 | 2 | Quinizarine | 10 | 0 | Blackbird. |

TEST COMPOUND: 2,5-DITHIAHEXANE-CUPROUS CYANIDE ADDUCT

| | | | | | | |
|---|---|---|---|---|---|---|
| 203 | 10 | 0 | None | 10 | 48 | Pigeon. |
| 204 | 10 | 0 | Anthraquinone | 10 | 5 | Dove. |
| 205 | 10 | 0 | Arasan 50 | 10 | 0 | Pigeon. |
| 206 | 10 | 0 | Arasan 75 | 10 | 0 | Do. |
| 207 | 4 | 0 | Anthraquinone | 10 | 0 | Do. |
| 208 | 4 | 1 | Arasan 50 | 10 | 0 | Do. |
| 209 | 2 | 0 | Anthraquinone | 10 | 0 | Do. |
| 210 | 2 | 6 | Arasan 50 | 10 | 0 | Do. |
| 211 | 1 | 6 | Anthraquinone | 10 | 0 | Do. |
| 212 | 1 | 0 | Arasan 50 | 10 | 0 | Do. |

TEST COMPOUND: 2,5-DITHIAHEXANE-ZINC CHLORIDE ADDUCT

| | | | | | | |
|---|---|---|---|---|---|---|
| 213 | 10 | 2 | None | 10 | 50 | Pigeon. |
| 214 | 10 | 0 | Spergon | 10 | 8 | Do. |
| 215 | 10 | 0 | Quinizarine | 10 | 0 | Dove. |
| 216 | 10 | 0 | Arasan 50 | 10 | 1 | Pigeon. |
| 217 | 10 | 0 | Arasan 75 | 10 | 0 | Dove. |
| 218 | 4 | 10 | Anthraquinone | 10 | 0 | Pigeon. |
| 219 | 4 | 0 | Arasan 50 | 10 | 0 | Do. |
| 220 | 2 | 2 | Anthraquinone | 10 | 0 | Do. |
| 221 | 2 | 0 | Arasan 50 | 10 | 0 | Do. |
| 222 | 1 | 0 | Anthraquinone | 10 | 0 | Do. |
| 223 | 1 | 0 | Arasan 50 | 10 | 0 | Do. |
| 224 | 1 | 0 | Spergon | 10 | 0 | Yellowhead. |

[1] Tetrachloro-para-benzoquinone, produced by U.S. Rubber Corporation.
[2] Tetramethyl thiuram disulfide, produced by Du Pont.

EXAMPLE II

In another test, 3.4 grams of several test compounds were dissolved or dispersed in 20 mls. of xylene. The resulting solution or dispersion was mixed with 340 grams (500 mls.) of grain. The xylene was subsequently allowed to evaporate. Separate pans containing the test grains and a control sample were placed on a building roof for a period of 10 days or until all of the grain had been consumed by birds. The following data were taken.

Table II

| | Days in Test | Total Grain Eaten, Ml. | Average Grain Eaten Per Day, Ml. |
|---|---|---|---|
| Cuprous methyl mercaptide | 10 | 160 | 16 |
| Cuprous tert-butyl mercaptide | 10 | 500 | 50 |
| Cuprous tert-octyl mercaptide | 10 | 325 | 32.5 |
| Cuprous tert-dodecyl mercaptide | 10 | 0 | 0 |
| Zinc tert-butyl trithiocarbonate | 2 | 500 | 250 |
| Zinc tert-dodecyl trithiocarbonate | 5 | 500 | 100 |
| None | 1 | 500 | 500 |

In this outdoor test, all compounds showed some repellency toward birds. The mercaptides were particularly attractive.

Reasonable variation and modification are possible within the scope of the foregoing disclosure and the appended claims to the invention, the essence of which is that it has been found that birds can be repelled by applying to the surfaces frequented by them an amount of at least one of the compounds selected from the group consisting of cuprous and zinc alkyl sulfonium chlorides, cuprous and zinc alkyl sulfonium cyanides, dithiahexane adducts with cuprous and zinc chlorides and cuprous and zinc cyanides, cuprous and zinc mercaptides, and zinc a cupric trithiocarbonates.

I claim:
1. A method of repelling birds from a material whi otherwise a bird would eat comprising treating said ma rial with at least one compound of the formula

$$R\text{—}S\text{—}Cu$$

wherein R is an alkyl group having from 1 to 20 carb atoms.

2. A material protected against ravaging or eating birds, said material having been impregnated according the method of claim 1.

3. A method of repelling birds from a material whi otherwise a bird would eat comprising treating said ma rial with at least one compound of the formula $$(R\text{—}S\text{—}\overset{\overset{S}{\|}}{C}\text{—}S)_n M$$

wherein R is an alkyl group containing from 1 to carbon atoms, M is a metal ion selected from the gro consisting of cupric and zinc, and $n$ is the valence of t metal ion.

4. A material protected against ravaging or eating birds, said material having been impregnated accordi to the method of claim 3.

5. A method of repelling birds from a material whi otherwise a bird would eat comprising treating said ma rial with cupric trithiocarbonate.

6. A material protected against ravaging or eating birds, said material having been impregnated accordi to the method of claim 5.

7. A method of repelling birds from a material whi otherwise a bird would eat comprising treating said ma rial with zinc trithiocarbonate.

8. A material protected against ravaging or eating birds, said material having been impregnated according the method of claim 7.

9. A method of repelling birds from a material whi otherwise a bird would eat comprising treating said ma rial with a cuprous alkyl sulfonium cyanide, wherein t alkyl group contains from 1 to 20 carbon atoms.

10. A material protected against ravaging or eati by birds, said material having been impregnated accoi ing to the method of claim 9.

11. A method of repelling birds from a material whi otherwise a bird would eat comprising treating said ma rial with a zinc alkyl sulfonium cyanide, wherein the alk group contains from 1 to 20 carbon atoms.

12. A material protected against ravaging or eating birds, said material having been impregnated accordi to the method of claim 11.

13. A method of repelling birds from a material whi otherwise a bird would eat comprising treating said ma rial with a cuprous alkyl sulfonium chloride, wherein t alkyl group contains from 1 to 20 carbon atoms.

14. A material protected against ravaging or eating birds, said material having been impregnated accordi to the method of claim 13.

15. A method of repelling birds from a material whi otherwise a bird would eat comprising treating said ma rial with a zinc alkyl sulfonium chloride, wherein t alkyl group contains from 1 to 20 carbon atoms.

16. A material protected against ravaging or eating birds, said material having been impregnated accordi to the method of claim 15.

17. A method of repelling birds from a material whi otherwise a bird would eat comprising treating said mat rial with 2,5-dithiahexane-cuprous cyanide adduct.

18. A material protected against ravaging or eating birds, said material having been impregnated accordi to the method of claim 17.

19. A method of repelling birds from a material whi otherwise a bird would eat comprising treating said mat rial with 2,5-dithiahexane-zinc cyanide adduct.

20. A material protected against ravaging or eating by birds, said material having been impregnated according to the method of claim 19.

21. A method of repelling birds from a material which otherwise a bird would eat comprising treating said material with 2,5-dithiahexane-cuprous chloride adduct.

22. A material protected against ravaging or eating by birds, said material having been impregnated according to the method of claim 21.

23. A method of repelling birds from a material which otherwise a bird would eat comprising treating said material with 2,5-dithiahexane-zinc chloride adduct.

24. A material protected against ravaging or eating by birds, said material having been impregnated according to the method of claim 23.

References Cited in the file of this patent

UNITED STATES PATENTS

| | | |
|---|---|---|
| 2,779,703 | Crouch et al. | Jan. 29, 1957 |
| 2,840,502 | Lambreck | June 24, 1958 |